Dec. 8, 1925.
J. A. EDEBORG
HOSE CLAMP
Filed April 20, 1923
1,564,837
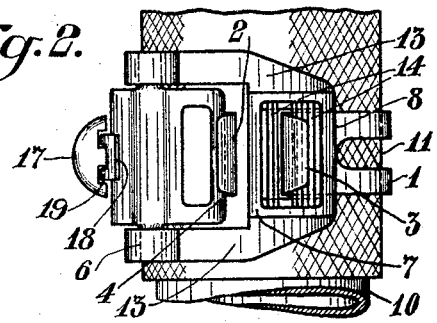
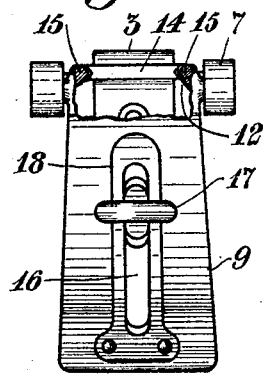
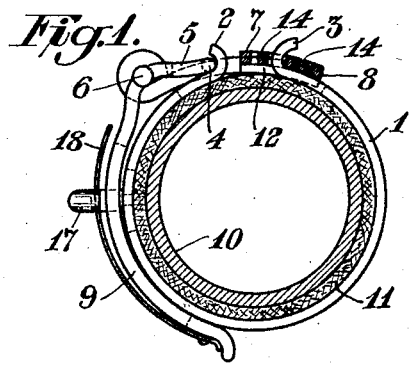
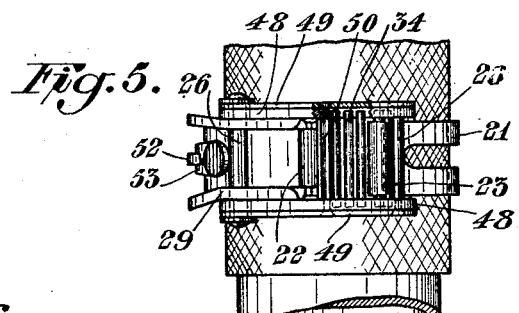
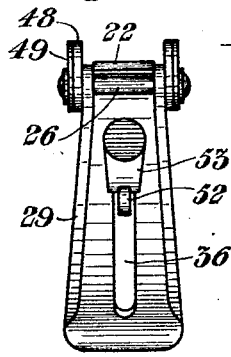
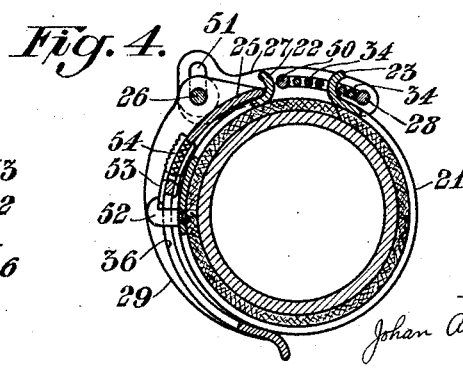
Inventor:
Johan August Edeborg
By George Bayard Jones
Atty.

Patented Dec. 8, 1925.

1,564,837

UNITED STATES PATENT OFFICE.

JOHAN AUGUST EDEBORG, OF ESKILSTUNA, SWEDEN.

HOSE CLAMP.

Application filed April 20, 1923. Serial No. 633,396.

*To all whom it may concern:*

Be it known that I, JOHAN AUGUST EDEBORG, a subject of the King of Sweden, residing at Eskilstuna, Sweden, have invented a new and useful Improvement in Hose Clamps, of which the following is a specification.

This invention relates to a hose clamp of the kind which consists of a flexible and preferably elastic metal band and a tightening device or buckle between the ends of the band, said buckle consisting of a link or chape adapted to be attached to one end of the band and in which a lever is journalled, to one arm of which the other end of said band is adapted to be attached, and by the turning or swinging of which lever in towards the band the ends of the band will be moved towards one another and thus the band tightened.

The present invention contemplates an improvement in hose clamps of the type indicated and has for its purpose to render possible an easy and simple variation or adjustment of the distance which exists between the points of attachment of the band to the ends of the buckle when the lever is in the position swung in towards the band, and in this manner to make the hose clamp readily adaptable to hose of different thicknesses. For this purpose the invention is principally characterized by that a number of laminæ or distance pieces are movably provided in the link in such manner that the end of the band may be attached to the link either directly or with one or more distance pieces interposed between the band and the link.

The invention further comprises the improvement that the fulcrum or pivot pin of the lever is movable in slots in the link which slots run approximately in the direction of the radius of the hose clamp. When a number of distance pieces are interposed between one end of the band and the link this arrangement makes it easier to hook the arm of the lever to the other end of the band as the fulcrum or pivot pin of the lever may move in the slots in the link.

The accompanying drawing illustrates two embodiments of the invention by way of example. Fig. 1 shows an end view of the one embodiment of the hose clamp partially in section, and Figs. 2 and 3 show the hose clamp viewed from above and from one side, respectively, in Fig. 1, Figs. 4, 5 and 6 are similar views of the other embodiment of the hose clamp.

The ends of the flexible and preferably elastic metal band 1 are formed as hooks 2 and 3. The buckle consists of a chape or link 7 having at one end a cross piece 8 to which one of the hooks 2 and 3 may be attached after the band has been placed around the hose 11 which is pushed onto the tube or nozzle 10. In the other end of the link 7 a lever 5, 9 is journalled by means of its pivots 6. The short arm 5 of said lever possesses a cross piece 4 which may be introduced into the other of the hooks 2 and 3, after which the long arm 9 is swung down or in towards the band 1 whereby it is obvious that the ends 2 and 3 of the band will be moved towards one another so that the band becomes tightened around the hose 11.

In the embodiment illustrated in Figs. 1, 2 and 3 the means for variation or adjustment of the distance between the ends of the band when the arm 9 is swung in towards the band, consists of a number of laminæ or distance pieces 14 in the link 7. As shown in Fig. 3, said distance pieces 14 have angular cuts at their ends by means of which they are retained and slide on angular guides 15 in the sides of the link 7. By this means the hook 3 on the band 1 may be locked either directly to the outer cross piece 8 of the link 7, or one or more of the distance pieces 14 may be interposed between the hook 3 and the cross piece 8, as shown in Figs. 1 and 2.

In the long arm 9 of the lever 5, 9 there is provided an oblong slot 16. A small handle or knob 17 is rotatably secured to the band 1 and when adjusted in the peripheral direction of the band, it may be passed through the slot 16 when it will simultaneously pass through a corresponding slot in a spring 18 which is secured to the arm 9. After said spring 18 has been pressed down, the knob 17 may be turned across the slot 16 in the arm 9, and when the spring 18 is released its two halves or shanks will spring into recesses 19 in the under side of the knob 17 whereby the knob will of course be securely locked in its position across the slot. It will be understood that it would also be possible to use a spring extending only along one side of the slot 16.

In the under side of the link there is a recess or cavity 12 providing a space or clearance for the band 1 so that said band will not prevent the remaining portions of the inner face of the link from reaching down to the hose, and the lateral portions 13 of the link on either side of said cavity and of the band will thus be pressed against the hose 11 so that said hose will be securely pressed against the tube or nozzle 10 also between the ends 2 and 3 of the band 1.

In the embodiment illustrated in Figs. 4, 5 and 6 the band 21 also has its ends formed as hooks 22 and 23. The tightening device or the buckle also consists of a chape or link 27 in which a lever 25, 29 is journalled on a pin 26. The link is provided at its opposite end with a cross piece or stay 28 to which the end 23 of the band may be hooked. The short arm 25 of the lever 25, 29 is afterwards hooked to the end 22 of the band, after which the lever is swung in towards the band 21 when it will be evident that the ends of the band will be moved towards one another so that the band becomes tightened around the hose or the like around which the band has been placed. In this embodiment the distance pieces the provision of which renders the hose clamp easily applicable to hose of different thicknesses, consist of metal pins or staffs 34. As shown in Fig. 5, the ends of said staffs 34 are introduced into slots in the side members of the link 27 each of said side members consisting of a plate 48 provided with said slot and an outer plate 49 closing said slot outwards. The two side members of the links are joined by the cross piece or stay 28 and a second stay 50 both of which are riveted on the outer sides of the link.

When, as illustrated in Fig. 4, a number of distance pieces of staffs 34 are interposed between the stay 28 and the end 23 of the band, the link 27 has of course a tendency, particularly when the buckle is being closed, to adjust itself in what may be termed the peripheral continuation of the band, and in view hereof, and in order to facilitate the engagement of the lever arm 25 with the end 22 of the band, this embodiment shows the improvement that the pin 26 is movable in slots 51 in the link which slots extend approximately in the radial direction of the hose clamp. When attaching the lever arm 25 to the hook 22 of the band the pin 26 may thus move in the slots 51 away from the band, so that the engagement is facilitated, and when afterwards the long arm 29 of the lever is swung in towards the band the pin 26 will move inwards in the slots 51, particularly when said slots, as shown in Fig. 4, have such inclined direction relatively to the radius that the tension of the band tends to move the pin 26 towards the inner ends of the slots 51.

The different parts are maintained in the last mentioned position by the tension of the band, but in order to safeguard the buckle from being opened for instance by a blow against the end of the lever arm 29, said arm is provided with a slot 36 through which a hook 52 secured to the band 21 projects. A catch 53 is movable in the lever arm 29 and is actuated by a spring 54 in such direction that when the lever arm 29 is swung in to bear against the band, the spring 54 moves the catch 53 in under the hook 52. When the buckle is to be opened the catch 53 is pushed back against the action of the spring 54, after which the lever arm 29 is swung out from the band.

I claim:

1. In a hose clamp the combination of a buckle comprising a link and a lever journalled at one end of said link, a flexible metal band having means at one end for attaching the band to one arm of said lever and having a hook at its other end for attachment to said link, and a number of distance pieces movable in said link and adapted to be interposed in different numbers between said link and said hook on said band.

2. In a hose clamp the combination of a buckle comprising a link and a lever journalled at one end of said link in slots in the same, a flexible metal band having means at one end for attaching the band to one arm of said lever and having a hook at the other end for attachment to said link, and a number of distance pieces movable in said link and adapted to be interposed in different numbers between said link and said hook on said band.

3. In a hose clamp the combination of a buckle comprising a link and a lever journalled at one end of said link in slots in the same, a flexible metal band having means at one end for attaching the band to one arm of said lever and having a hook at the other end for attachment to said link, said link having a clearance space in its under face for receiving said band, and a number of distance pieces movable in said link and adapted to be interposed in different numbers between said link and said hook on said band.

4. In a hose clamp the combination of a buckle comprising a link and a lever journalled at one end of said link in slots in the same, a flexible metal band having means at one end for attaching the band to one arm of said lever and having a hook at its other end for attachment to said link, a number of distance pieces movable in said link and adapted to be interposed in different numbers between said link and said hook on said band, said lever having a slot, a hook secured to said band and adapted to project through said slot in said lever, and a spring-actuated catch in said lever adapted to engage said hook.

5. In a hose clamp the combination of a buckle comprising a link and a lever journalled at one end of said link, a flexible metal band having means at one end for attaching the band to one arm of said lever and having a hook at the other end for attachment to said link, a number of distance pieces movable in said link and adapted to be interposed in different numbers between said link and said hook on said band, said lever having a slot, a knob rotatably secured to said band and adapted to project through said slot and to be turned across the same, said knob having at least one recess in its under face, and a spring secured to said lever alongside of said slot in the same and adapted to engage said recess in said knob.

6. In a hose clamp the combination of a buckle comprising a link and a lever journalled in said link, a flexible metal band having means at one end for attaching the band to one arm of said lever and having a hook at the other end for attachment to said link, said link having a clearance space in its under face for receiving said band, and a number of distance pieces movable in said link and adapted to be interposed in different numbers between said link and said hook on said band.

7. In a hose clamp the combination of a buckle comprising a link and a lever journalled in said link, a flexible metal band having means at one end for attaching the band to one arm of said lever and having a hook at its other end for attachment to said link, a number of distance pieces movable in said link and adapted to be interposed in different numbers between said link and said hook on said band, said lever having a slot, a hook secured to said band and adapted to project through said slot in said lever, and a spring-actuated catch in said lever adapted to engage said hook.

JOHAN AUGUST EDEBORG.